United States Patent
Matsumoto et al.

(10) Patent No.: US 8,941,535 B2
(45) Date of Patent: Jan. 27, 2015

(54) METHOD, DEVICE AND PROGRAM FOR DISPLAYING ECHO IMAGE

(75) Inventors: Satoshi Matsumoto, Nishinomiya (JP); Kazuya Nakagawa, Nishinomiya (JP)

(73) Assignee: FURUNO Electric Company Limited, Nishinomiya (JP)

( * ) Notice: Subject to any disclaimer, the term of this patent is extended or adjusted under 35 U.S.C. 154(b) by 428 days.

(21) Appl. No.: 13/299,371

(22) Filed: Nov. 18, 2011

(65) Prior Publication Data

US 2012/0127026 A1  May 24, 2012

(30) Foreign Application Priority Data

Nov. 19, 2010  (JP) .................................. 2010-259369

(51) Int. Cl.
*G01S 13/00* (2006.01)
*G01S 7/06* (2006.01)
*G01S 7/10* (2006.01)

(52) U.S. Cl.
CPC .. *G01S 7/064* (2013.01); *G01S 7/10* (2013.01)
USPC .......................................................... 342/179

(58) Field of Classification Search
USPC .......................................................... 342/179
See application file for complete search history.

(56) References Cited

U.S. PATENT DOCUMENTS

| | | | |
|---|---|---|---|
| 4,074,264 A * | 2/1978 | Wilmot | 342/90 |
| 6,014,099 A * | 1/2000 | Bennett et al. | 342/25 F |
| 7,417,578 B1 * | 8/2008 | Woodell et al. | 342/26 R |
| 2003/0189511 A1 * | 10/2003 | Lasky et al. | 342/22 |
| 2010/0034287 A1 * | 2/2010 | Roman | 375/240.21 |
| 2010/0214151 A1 * | 8/2010 | Kojima et al. | 342/28 |

FOREIGN PATENT DOCUMENTS

| | | |
|---|---|---|
| JP | 04-174658 A | 6/1992 |
| JP | 4-274784 A | 9/1992 |
| JP | 06-174827 A | 6/1994 |
| JP | 6-214004 A | 8/1994 |
| JP | 2002-296341 A | 10/2002 |
| JP | 2002296341 A * | 10/2002 |

OTHER PUBLICATIONS

Chinese Office Action, dated Sep. 25, 2014, in application No. CN2011/10349745.

* cited by examiner

*Primary Examiner* — Timothy A Brainard
(74) *Attorney, Agent, or Firm* — Birch, Stewart, Kolasch & Birch, LLP

(57) ABSTRACT

This disclosure provides an echo image display device, which includes an antenna for discharging electromagnetic waves and receiving echo signals reflected on one or more target objects, an echo signal input unit for inputting the echo signals from the antenna, an echo signal level detector for detecting a level of each of the echo signals with reference to a distance and an azimuth from the antenna, an image data generating module for generating image data based on the levels of the echo signals, a display unit for displaying the image data, and a data amount changing module for changing a data amount rate of a predetermined area that is set as a part of a display area of the display unit, into a different rate in another part of the display area.

11 Claims, 9 Drawing Sheets

METHOD, DEVICE AND PROGRAM FOR DISPLAYING ECHO IMAGE

CROSS-REFERENCE TO RELATED APPLICATION(S)

The application claims priority under 35 U.S.C. §119 to Japanese Patent Application No. 2010-259369, which was filed on Nov. 19, 2010, the entire disclosure of which is hereby incorporated by reference.

TECHNICAL FIELD

The present invention relates to an echo image display method, device and program for displaying an echo image based on an echo signal caused by discharging of an electromagnetic wave.

BACKGROUND OF THE INVENTION

In radar devices, there is a radar device for simultaneously displaying on a display where the echo image is displayed, a normal image and an enlarged image in which a part where a target object exists is enlarged (see JP2002-296341A).

However, the enlarged image in JP2002-296341A is only the normal image simply being enlarged, and a resolution level thereof is not changed. Therefore, the enlarged image includes the same information amount as the normal image.

SUMMARY OF THE INVENTION

Thus, the present invention is made in view of the above situation, and provides an echo image display device that is increased in an information amount of an echo image to be displayed.

According to an aspect to the invention, an echo image display device is provided, which comprises an antenna for discharging electromagnetic waves and receiving echo signals reflected on one or more target objects, an echo signal input unit for inputting the echo signals from the antenna, an echo signal level detector for detecting a level of each of the echo signals with reference to a distance and an azimuth from the antenna, an image data generating module for generating image data based on the levels of the echo signals, a display unit for displaying the image data, and a data amount changing module for changing a data amount rate of a predetermined area that is set as a part of a display area of the display unit, into a different rate in another part of the display area.

Thereby, an information amount of an echo image to be displayed is increased.

The data amount changing module may change the data amount rate by changing a number of electromagnetic wave discharges at predetermined azimuths within the predetermined area.

The data amount changing module may change the data amount rate by changing a sampling rate of the echo signals within the predetermined area.

The data amount changing module may change the data amount rate by interpolating the image data within the predetermined area.

The echo image display device may further comprise an image memory for temporarily storing the image data of the predetermined area. The image data generating module may average the image data of the predetermined area stored in the image memory and generates image data before the change of the data amount rate of the predetermined area. The display unit may display the image data before the change of the data amount rate.

The echo image display device may further comprise a correlation processor for performing scan-to-scan correlation processing to find a correlation between the echo signals from a plurality of scans, one scan being made of echo signals in a plurality of azimuths.

The echo image display device may further comprise an image memory for temporarily storing image data after the change of the data amount rate of the predetermined area and image data before the change of the data amount rate of the predetermined area, and a correlation processor for performing first correlation processing to find a correlation between a plurality of scans of the stored image data after the change of the data amount rate, the image data being used as past echo signal scans, one scan being made of echo signals in a plurality of azimuths, and update the image data after the change of the data amount rate, the correlation processor further performing second correlation processing to find a correlation between a plurality of scans of the stored image data before the change of the data amount rate, the image data being used as past echo signal scans, one scan being made of echo signals in a plurality of azimuths, and update the image data before the change of the data amount rate.

The correlation processor may find the correlations by setting weight on the echo signals so that the weight of the echo signals from the past scan in the second correlation processing is larger than the weight of the echo signals from the past scan in the first correlation processing.

The echo image display device may further comprise a moving speed detector for detecting a moving speed of a ship where the echo image display device is mounted. The correlation processor may set weight on the echo signals and may increase the weight of the echo signals from the past scan with an increase of the moving speed.

According to another aspect of the invention, a radar apparatus is provided, which comprises the echo image display device of any of the other aspects built therein.

According to another aspect of the invention, a method of displaying an echo image is provided, which comprises discharging electromagnetic waves from an antenna and receiving echo signals reflected on one or more target objects, inputting the echo signals from the antenna, detecting a level of each of the echo signals with reference to a distance and an azimuth from the antenna, generating image data based on the levels of the echo signals, displaying the image data on a display unit, and changing a data amount rate of a predetermined area that is set as a part of a display area of the display unit, into a different rate in another part of the display area.

According to another aspect of the invention, a program for causing a computer to display an echo image is provided, which comprises causing a computer to discharge electromagnetic waves from an antenna and receiving echo signals reflected on one or more target objects, causing a computer to input the echo signals from the antenna, causing a computer to detect a level of each of the echo signals with reference to a distance and an azimuth from the antenna, causing a computer to generate image data based on the levels of the echo signals, causing a computer to display the image data on a display unit, and causing a computer to change a data amount rate of a predetermined area that is set as a part of a display area of the display unit, into a different rate in another part of the display area.

According to the above aspects, for changing a data amount rate of the image data, for example, the method of changing the number of electromagnetic wave discharges at the predetermined azimuths within the predetermined area, the method of changing the sampling rate of the echo signals within the predetermined area, and the method of interpolating the image data within the predetermined area are used. In the aspects of the invention, by narrowing the area, where the information amount is increased, down to a part of the display area, a load on the device is reduced.

Moreover, in a case where both the image data after the change of the data amount rate (a high-resolution image) and the image data before the change of the data amount rate (a normal image) are displayed, for example, the device may include an image memory for temporarily storing the image data for the predetermined area, and the image data generating module may average the image data of the predetermined area stored in the image memory and generate the image data before the change of the data amount rate of the predetermined area. For example, when the high-resolution image of the position corresponding to one pixel in the normal image is comprised of sixteen pixels (4×4) of image data, the image data for these sixteen pixels is averaged to create image data of the normal image.

Moreover, when the radar device performs the scan-to-scan correlation processing for performing correlation processing (e.g., weighted summation) with an echo signal from the scan immediately before, by performing the scan-to-scan correlation between the high resolution image data of the predetermined area, scan-to-scan correlation processing with higher accuracy can be performed.

Furthermore, when displaying both the high-resolution image and the normal image, the correlation processing of the image data of the normal image from the scan immediately before with the image data from the current scan which is the high-resolution image is performed to update the image data of the normal image. Here, in the scan correlation processing of the normal image, the weighting amount of the echo signal from the scan immediately before (corresponding to the normal image) is preferred to be larger than that in the scan-to-scan correlation processing between the high resolution image data.

Note that, in the scan correlation processing, there is a case where the position of the ship varies among a plurality of scans. In this case, by setting the weighting amount of the echo signal from the scan immediately before large (decreasing a contributing rate of the next scan) according to the increase of the moving speed of the ship, influence due to the deviation in position of the ship among the scans can be kept small.

According to the echo image display device of the aspects of the invention, an information amount to be displayed can be increased.

BRIEF DESCRIPTION OF THE DRAWINGS

The present disclosure is illustrated by way of example and not by way of limitation in the figures of the accompanying drawings, in which the like reference numeral indicate like elements and in which.

DESCRIPTION OF EMBODIMENT

Figure 1A:
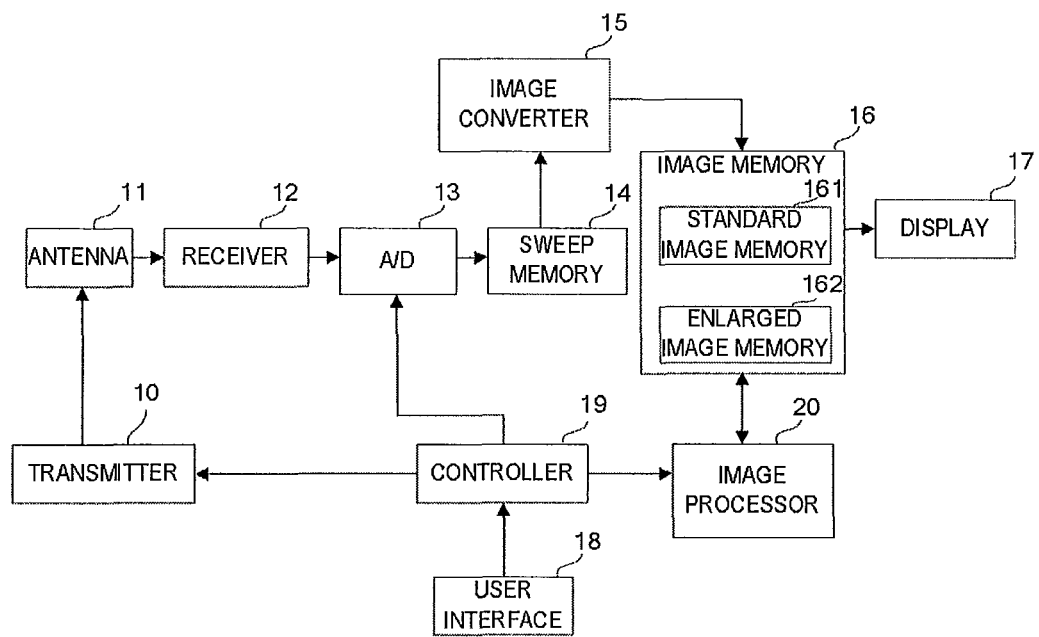
FIG. 1A is a block diagram showing a configuration of a radar device of an embodiment of the present invention.

Next, one embodiment of the present invention is described in detail with reference to the appended drawings. FIG. 1A is a block diagram showing a configuration of a radar device that is built with an echo image display device. The radar device is installed in, for example, a ship (hereinafter, it may be referred to as "own ship" or may be simply referred to as "the ship") and transmits and receives electromagnetic waves around own ship so as to detect a target object such as another ship.

In FIG. 1A, the radar device comprises a transmitter 10, an antenna 11, a receiver 12, an A/D converter 13, a sweep memory 14, an image converter 15, an image memory 16, a display 17, a user interface 18, a controller 19, and an image processor 20.

The radar device discharges an electromagnetic wave from the antenna 11 in response to a transmission signal that is outputted from the transmitter 10. The electromagnetic wave is discharged at various azimuths around the ship. The echo signal is received by the antenna 11 and introduced to the receiver 12.

The receiver 12 outputs to the A/D converter 13 a value corresponding to a level of the echo signal received by the antenna 11. The A/D converter 13 converts the inputted echo signal of an analog value into a digital value and outputs it to the sweep memory 14 as measurement data.

The sweep memory 14 stores the measurement data for one measurement cycle (360° around the ship). Each measurement data is stored as sample data (sweep data) associated with an azimuth and a distance in a polar coordinate system.

The image converter 15 is inputted with the sweep data from the sweep memory 14, converts it to be in association with a rectangular coordinate system having a position of the ship as its origin, and outputs it as a pixel intensity value of a gradation corresponding to the level of each sweep data. The pixel intensity value of the rectangular coordinate system is stored in the image memory 16 as image data.

Figure 1B:
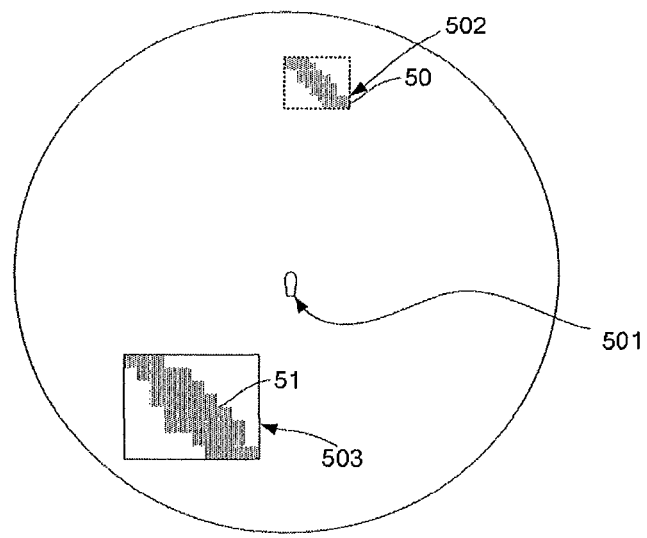
FIG. 1B is a view showing an example of an echo image displayed on a display.

The display 17 reads out the image data stored in the image memory 16 and displays an echo image as shown in FIG. 1B. For example, as shown in FIG. 1B, when the target object exists on the right front side of own ship 501, a high-level echo signal is received from an azimuth and a distance where the target object exists. Therefore, the display 17 displays the echo image (standard image 50) with a high intensity value (darker color in FIG. 1B).

Here, in the radar device of this embodiment, a part of a display area of the display 17 is set as an enlargement area 502, and an enlarged echo image of the echo image within the set enlargement area 502 is displayed in an enlarged window 503. As a result, the standard image 50 is enlarged and an enlarged image 51 is displayed in the enlarged window 503.

A memory space 161 (standard image memory) for storing the image data for the standard image, which is to be displayed within the display area of the display 17, and a memory space 162 (enlarged image memory) for storing the image data for the enlarged image are secured in the image memory 16.

The image data stored in the enlarged image memory 162 has a data amount rate (data amount per displayed area) higher than the image data stored in the standard image memory 161, and has a higher resolution (resolution level). For example, while the standard image data is made of one pixel, the enlarged image data is comprised of sixteen pixels (4×4) of image data. The following methods are used for the radar device to generate such enlarged image data.

Figure 2A:
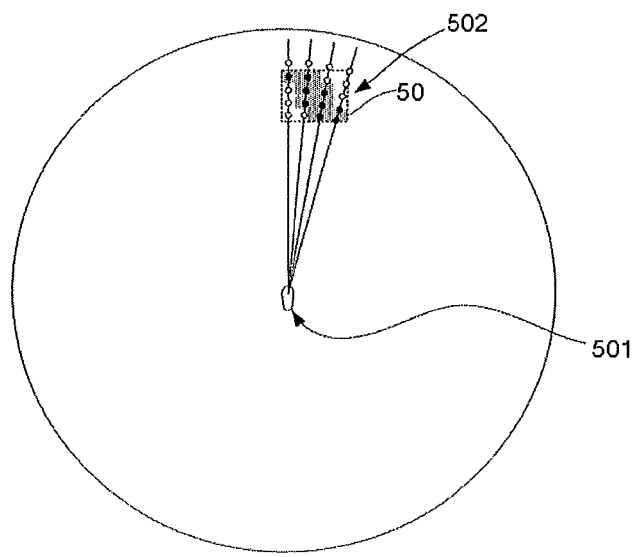
FIGS. 2A and 2B are views indicating a method of changing a number of electromagnetic wave discharges at predetermined azimuths.
Figure 2B:
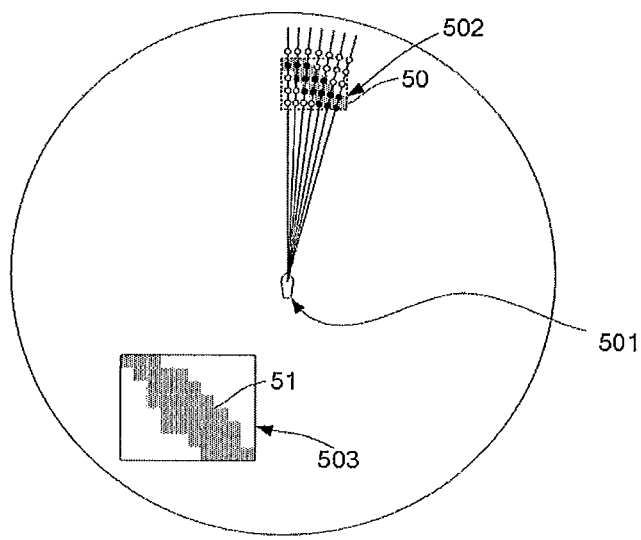

(1) Method of Changing the Number of Electromagnetic Wave Discharges at Predetermined Azimuths FIGS. 2A and 2B are views indicating a method of changing the number of electromagnetic wave discharges at predetermined azimuths. In this example, as shown in FIG. 2A, the target object exists on the right front side of own ship 501, and the rectangular enlargement area 502 containing the standard image 50 is specified so as to enlarge the echo image (standard image 50) corresponding to the target object. The specifying of the enlargement area 502 is generally performed through a key input by a user via the user interface 18; however, it may be such that the radar device first detects the target object, and then the enlargement area is automatically specified to be an area corresponding to the detected target object.

The controller 19 instructs the transmitter 10 to increase the number of transmission signals to be outputted for a predetermined time length at azimuths corresponding to the specified enlargement area 502. Thereby, at the azimuths corresponding to the enlargement area 502, the number of the electromagnetic wave discharges at the predetermined azimuths increases. In the example shown in FIG. 2A, at the azimuths corresponding to the enlargement area 502, the electromagnetic wave is discharged four times and four sets of sweep data is to be stored in the sweep memory 14. On the other hand, at the azimuths corresponding to the enlargement area 502, as a result of doubling the number of the electromagnetic wave discharges at the predetermined azimuths, as shown in FIG. 2B, seven sets of sweep data is to be stored in the sweep memory 14.

Therefore, the image data of the enlarged image 51 stored in the enlarged image memory 162 is stored in a state where the resolution for the same position (position corresponding to the enlarged area 502) is improved in the azimuth direction compared to the image data stored in the standard image memory 161. That is, the enlarged image 51 to be displayed in the enlarged window 503 is to be displayed as an image in which the resolution level is improved in the azimuth direction. Note that, although increasing the number of the electromagnetic wave discharges causes a time interval for discharging the electromagnetic wave (reception period) to be shorter and a detection range may become shorter, the detection range can be maintained by, for example, dropping a rotation speed of the antenna or, in a case where a frequency of the transmission signal is modulated, changing a modulation system for every transmission so as to discriminate the echo signal for each transmission signal.

(2) Method of Changing a Sampling Rate of the Echo Signal

Figure 3A:
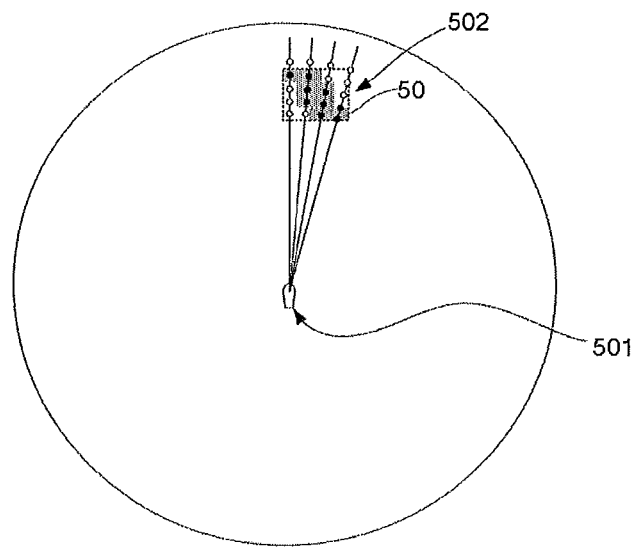
FIGS. 3A and 3B are views indicating a method of changing a sampling rate of an echo signal.
Figure 3B:
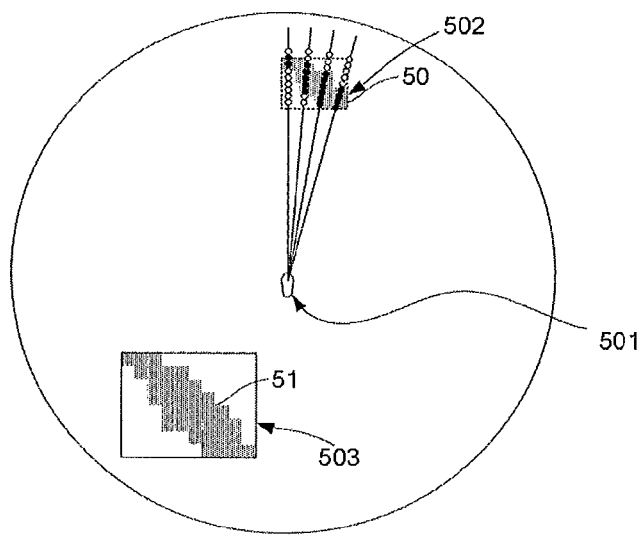

FIGS. 3A and 3B are views indicating a method of changing a sampling rate of an echo signal. Also in this example, as shown in FIG. 3A, the target object exists on the right front side of own ship 501, and the rectangular enlargement area 502 containing the standard image 50 is specified so as to enlarge the echo image (standard image 50) corresponding to the target object.

The controller 19 instructs the A/D converter 13 to increase the sampling rate of the echo signal corresponding to the specified enlargement area 502. Thereby, the number of the sampling data in distance direction for each azimuth corresponding to the enlargement area 502 increases. In the example of FIG. 3A, the sweep data for each azimuth corresponding to the enlargement area 502 contains data for five samples, and in total, data for twenty samples is contained within the enlargement area 502. On the other hand, as shown in FIG. 3B, as a result of doubling the sampling rate corresponding to the enlargement area, data for nine samples is contained in the respective sweep data, and in total, data for thirty six samples is contained within the enlargement area 502.

Therefore, the image data of the enlarged image 51 stored in the enlarged image memory 162 is stored in a state where the resolution for the same position (position corresponding to the enlargement area 502) is improved in the distance direction compared to the image data stored in the standard image memory 161. That is, the enlarged image 51 to be displayed in the enlarged window 503 is to be displayed as an image in which the resolution level is improved in the distance direction.

(3) Method of Interpolating the Image Data

Figure 4:
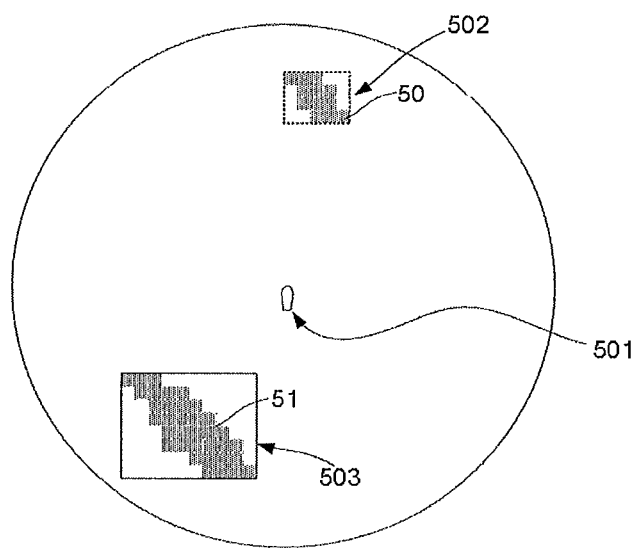
FIG. 4 is a view indicating a method of interpolating image data.

FIG. 4 is a view indicating a method of interpolating image data. Also in this example, as shown in FIG. 4, the target object exists on the right front side of own ship 501, and the rectangular enlargement area 502 containing the standard image 50 is specified so as to enlarge the echo image (standard image 50) corresponding to the target object.

The controller 19 instructs the image processor 20 to perform interpolation processing of the image data corresponding to the specified enlargement area 502. The interpolation processing is for calculating an average value of, for example, pixels adjacent to each other in distance and azimuth directions and generating image data corresponding to a new pixel between the two adjacent pixels based on the average value. Thereby, the number of data within the image data corresponding to the enlargement area 502 increases. Therefore, the enlarged image 51 to be displayed in the enlarged window 503 is displayed as an image in which the resolution level is improved in the distance and azimuth directions.

As described above, the radar device of this embodiment improves the resolution for the part of the area (specified enlargement area 502) on the radar screen and displays it as the enlarged image, therefore, the information amount that can be obtained by the user can be increased. Further, for example, for a case where a kind of the target object within this area (when discriminating, for example, target objects such as a large ship, a small ship, or a buoy) is to be detected, the detection accuracy thereof is improved. Note that, if the resolution within the entire area on the radar screen is improved, the data amount generally increases; however in this embodiment, by narrowing the area, where the resolution is improved, down to a part of the display area, the data amount is controlled and a load on the device is reduced.

Note that, only one of the above methods (1), (2) and (3) may be used or they may be used in combination with each other.

Figure 9:
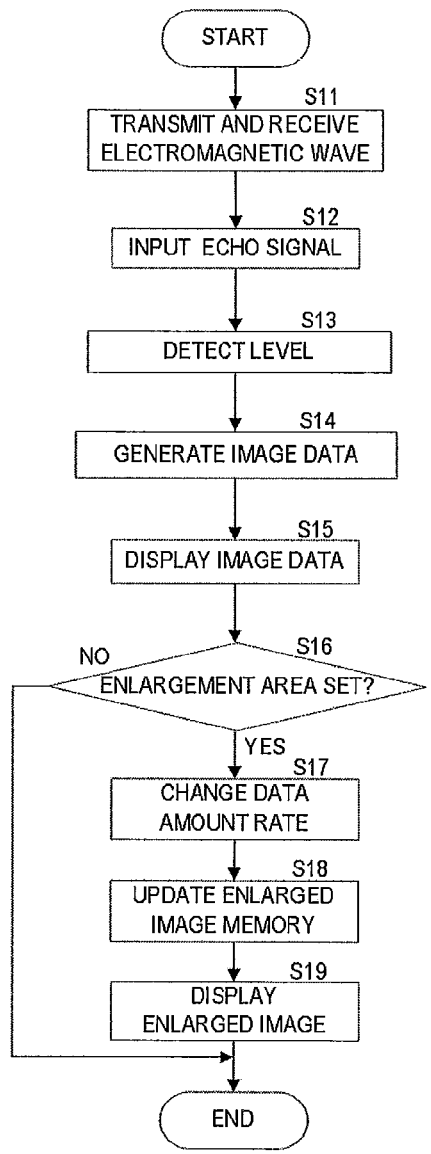
FIG. 9 is a flowchart showing an operation of the radar device.

FIG. 9 is a flowchart showing the above operation of the radar device. First the radar device discharges the electromagnetic wave from the antenna 11 in response to the transmission signal that is outputted from the transmitter 10, and receives the echo signal with the antenna 11 (S11). Then the receiver 12 is inputted with the echo signal received by the antenna 11 (S12), and performs the level detection processing for outputting the value corresponding to the level of the echo signal (S13). The value corresponding to the level of the echo signal is converted into the digital value by the A/D converter 13 and is stored in the sweep memory 14.

Then, the image converter 15 is inputted with the sweep data from the sweep memory 14, converts it to be in association with the rectangular coordinate system having the position of own ship as its origin, and outputs it as the pixel intensity value of the gradation corresponding to the level of each sweep data (S14). The display 17 reads out the image data stored in the image memory 16 and displays the echo image (S15).

Further, if the enlargement area 502 is set through the user interface 18 (S16), the controller 19 changes the data amount for the set area (S17). As described above, for the change of the data amount, at least one of the method of changing the number of the electromagnetic wave discharges at the predetermined azimuths within the set enlargement area 502, the method of changing the sampling rate of the echo signal, and the method of interpolating the image data is used. Due to the change of the data amount, the enlarged image memory 162 is updated (S18), then the enlarged window 503 in which, the echo image is enlarged, is displayed, and the enlarged image 51 is displayed (S19).

Figure 5:
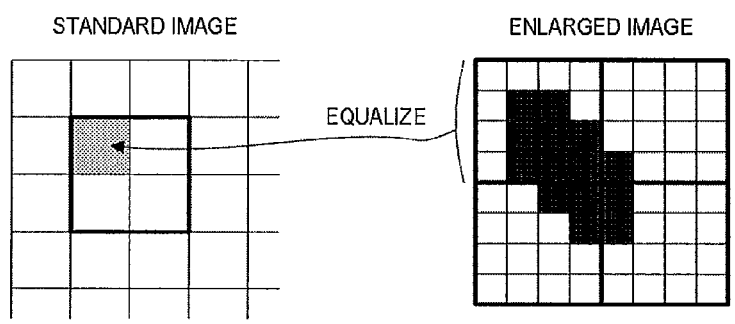
FIG. 5 is a view showing a relation between a standard image memory and an enlarged image memory.

Next, the other processing of the image processor 20 is described. When displaying both the standard image 50 and the enlarged image 51, if the enlargement area is specified, as far as the specified enlargement area is concerned, the resolution of an echo signal for sweep data to be inputted to the image processor 20 is changed, and causes a state where, although the image data in the enlarged image memory 162 is updated, the image data of the specified area, which is stored in the standard image memory 161, cannot be updated. Thus, as shown in FIG. 5, the image processor 20 reads out the image data of the specified area from the enlarged image memory 162, averages the image data of a plurality of pixels, and generates image data before the resolution is changed. For example, as shown in FIG. 5, when the enlarged image (high-resolution image) of the position corresponding to one pixel in the standard image is comprised of sixteen pixels (4×4) of image data, the image data for these sixteen pixels is averaged to create image data of the standard image.

Figure 6:
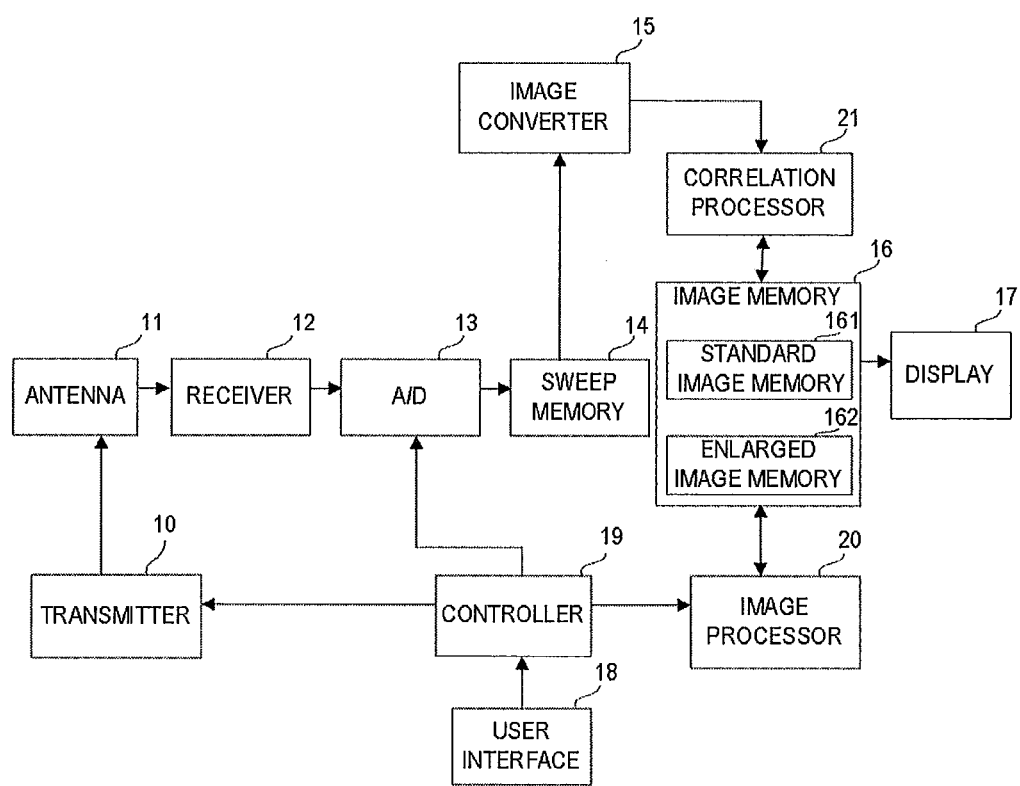
FIG. 6 is a block diagram showing a configuration of the radar device in a case where scan-to-scan correlation processing is performed.

Next, a configuration and an operation of the radar device in a case where a scan-to-scan correlation processing is performed are described. FIG. 6 is a block diagram showing the configuration of the radar device in the case where the scan-to-scan correlation processing is performed. Note that, the common configuration to the radar device shown in FIG. 1 is applied with the same numeral and the explanation thereof is omitted.

The radar device shown in FIG. 6 includes a correlation processor 21. The correlation processor 21 performs a correlation (weighted summation of the echo signals observed at substantially the same position) between the image data from the latest scan that is inputted from the image converter 15 and the image data read out from the output of the image memory 16 and corresponding to the scan immediately before (after scan-to-scan correlation processing), and outputs the data resulting from the current scan-to-scan correlation processing to the image memory 16.

That is, the correlation processor 21 performs weighting of the image data inputted from the image converter 15 by a coefficient (e.g., 1-α) and weighting of the image data read out from the image memory 16 by a coefficient (e.g., α), and further, by adding them, updates the image data for each pixel of the image memory 16.

Figure 7A:
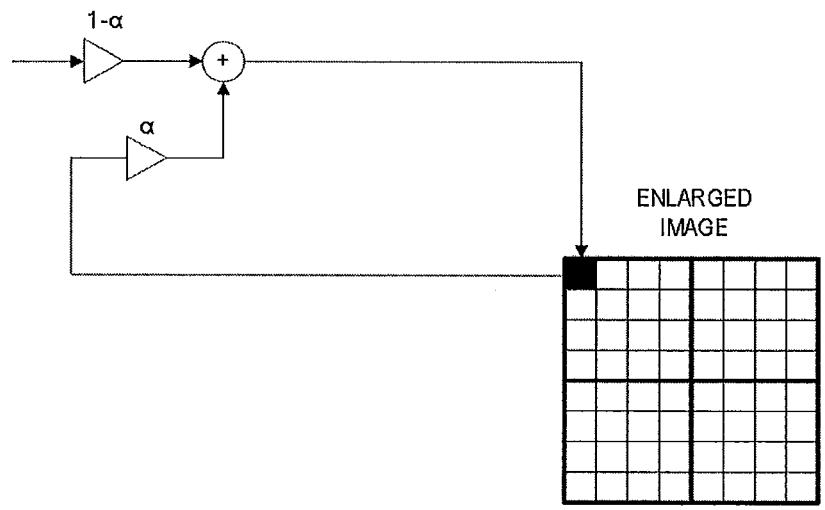
FIG. 7A is a diagram showing an example when the scan-to-scan correlation processing is performed on an enlarged image.

For the area where the resolution is not changed, the correlation processor 21 performs a correlation between the inputted image data and the standard image data read out from the standard image memory 161. On the other hand, as shown in FIG. 7A, for the area where the resolution is changed, the correlation processor 21 performs a correlation between image data that is newly inputted and the enlarged image data read out from the enlarged image memory 162. For example, by having a weighting coefficient for the image data that is newly inputted as 1-α and a weighting coefficient for the enlarged image data read out from the enlarged image memory 162 as α, the correlation processor 21 performs weighted summation of the image data. Thereby, scan-to-scan correlation processing with higher accuracy can be performed for the area where the resolution is changed. Note that, for this area where the resolution is changed, by using the image data to which the weighted summation is performed for the enlarged image data, the image processor 20 averages the image data of sixteen pixels as described above and generates image data of the standard image after the scan-to-scan correlation processing.

Figure 7B:
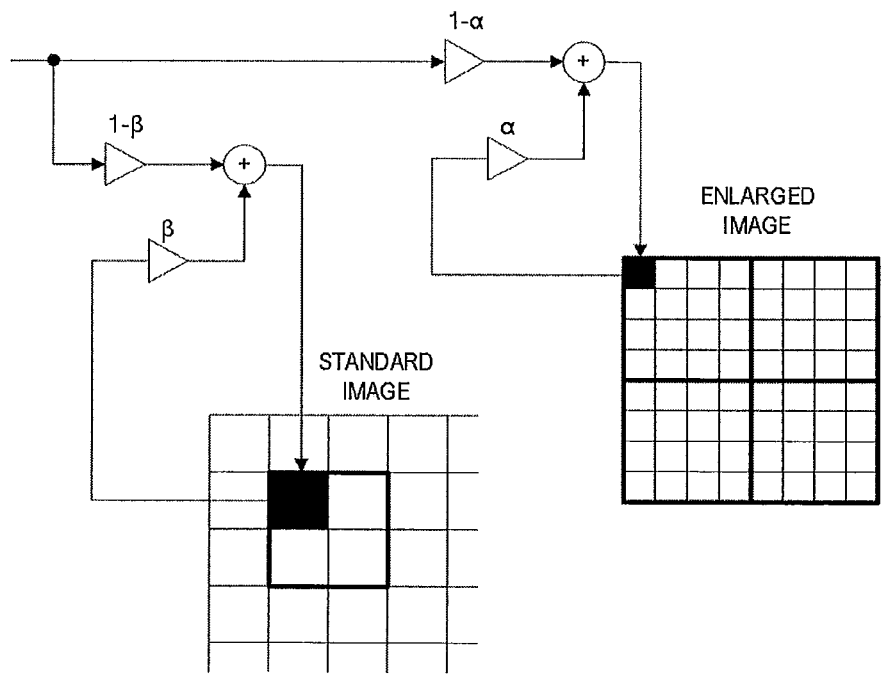
FIG. 7B is a diagram showing an example when the scan-to-scan correlation processing is performed on the enlarged image and a standard image.

Further, the correlation processor 21 may perform processing as shown in FIG. 7B. That is, for the standard image data, the correlation processor 21 performs weighted summation of the image data from the scan immediately before, which is stored in the standard image memory 161, and the image data of high resolution that is inputted from the image converter 15, as the image data from the latest scan. Here, the correlation processor 21 sets a weighting coefficient for the image data that is newly inputted to be small. For example, by setting β=16×α (β>α), it is preferred in the scan-to-scan correlation processing that a weighting coefficient 1-β for the standard image data (corresponding to the echo signal from the scan immediately before) is set to be smaller than the weighting coefficient 1-α for the high resolution image data.

Figure 8A:
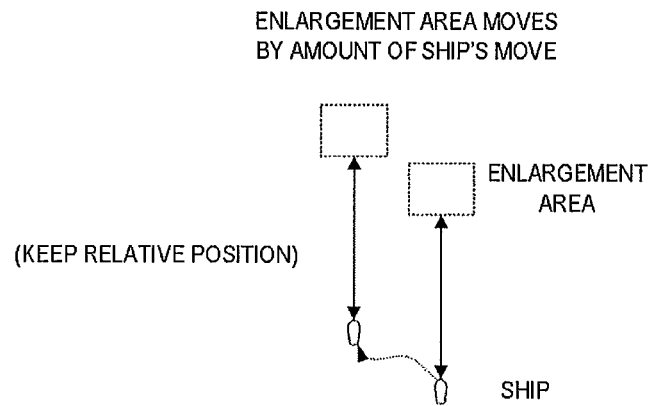
FIGS. 8A and 8B are views showing a change of an enlargement area due to a movement of own ship concerned.
Figure 8B:
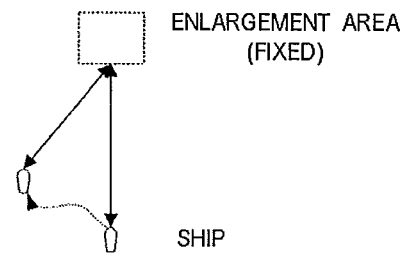

Note that, in the scan-to-scan correlation processing, there is a case where the position of own ship varies among a plurality of scans due to a movement of own ship. In this case, in performing the weighted summation of the image data of high resolution, one of the image data (the image data that is newly inputted) may deviate from the high resolution area and there is a possibility that the weighted summation is performed between the image data of high resolution and image data of standard resolution. Thus, a sensor (not illustrated) for detecting a moving speed of own ship is provided to the radar device and the correlation processor 21 sets the weighted coefficient for the image data that is newly inputted to approach "0" (increasing the value of α) according to the increase of the moving speed of the ship. Thereby, influence due to the variation in position of own ship among the scans can be kept small. Note that, as shown in FIG. 8A, the deviation in position of the resolution changing area is caused only in a case where a position specified is fixed, relative to own ship. For example, as shown in FIG. 8B, in a case where an absolute position is specified for the resolution changing area, image data of different resolution from a plurality of scans will not be inputted. Further, for the image data of standard resolution, the correlation processing is performed at the absolute position.

Note that, in this embodiment, the enlarged image is displayed in a separate window; however, an image with standard resolution within a specified area may be replaced with an image with high resolution. In this case, as the image with the standard resolution for the specified area does not need to be displayed, the standard image data for the specified area does not need to be held in the standard image memory.

Note that, by reducing a capacity of the standard image memory by the capacity of the data amount of the enlarged image memory, the total memory capacity may be maintained unchanged. For example, for the azimuth and distance where the radar device determines that the target object does not exist (e.g., the level of the echo signal is as low as a noise level), the standard image memory does not need to hold the image data of standard resolution (the image data is deleted), and thereby, a vacant space of the entire image memory can be secured.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the technique, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. An echo image display device, comprising:
    an antenna for discharging electromagnetic waves and receiving echo signals reflected on one or more target objects;
    an echo signal input unit for inputting the echo signals from the antenna;
    an echo signal level detector for detecting a level of each of the echo signals with reference to a distance and an azimuth from the antenna;
    an image data generating module for generating image data based on the levels of the echo signals;
    a display unit for displaying the image data; and
    a data amount changing module for
        changing a data amount rate of a predetermined area that is set as a first part of a display area of the display unit, into a different rate in a second part of the display area, without increasing an amount of data in other parts of the display area, and
        changing a number of detections of the echo signal level detector within the predetermined area by increasing the number of detections along the azimuth direction or the distance direction without changing a number of echo signal level detections in other parts of the display area.

2. The echo image display device of claim 1, wherein the data amount changing module changes the data amount rate by changing a number of electromagnetic wave discharges at predetermined azimuths within the predetermined area.

3. The echo image display device of claim 1, wherein the data amount changing module changes the data amount rate by changing a sampling rate of the echo signals within the predetermined area.

4. The echo image display device of claim 1, further comprising an image memory for temporarily storing the image data of the predetermined area,
    wherein the image data generating module averages the image data of the predetermined area stored in the image memory and generates image data before the change of the data amount rate of the predetermined area, and
    wherein the display unit displays the image data before the change of the data amount rate.

5. The echo image display device of claim 1, further comprising a correlation processor for performing scan-to-scan correlation processing to find a correlation between the echo signals from a plurality of scans, one scan being made of echo signals in a plurality of azimuths.

6. The echo image display device of claim 5, further comprising a moving speed detector for detecting a moving speed of a ship where the echo image display device is mounted,
    wherein the correlation processor sets weight on the echo signals and increases the weight of the echo signals from the past scan with an increase of the moving speed.

7. A radar apparatus comprising the echo image display device of claim 1 built therein.

8. An echo image display device, comprising:
    an antenna for discharging electromagnetic waves and receiving echo signals reflected on one or more target objects;
    an echo signal input unit for inputting the echo signals from the antenna;
    an echo signal level detector for detecting a level of each of the echo signals with reference to a distance and an azimuth from the antenna;
    an image data generating module for generating image data based on the levels of the echo signals;
    a display unit for displaying the image data;
    a data amount changing module for changing a data amount rate of a predetermined area that is set as a first part of a display area of the display unit, into a different rate in a second part of the display area;
    an image memory for temporarily storing image data after the change of the data amount rate of the predetermined area and image data before the change of the data amount rate of the predetermined area; and a correlation processor for performing first correlation processing to find a correlation between a plurality of scans of the stored image data after the change of the data amount rate, the image data being used as past echo signal scans, one scan being made of echo signals in a plurality of azimuths, and update the image data after the change of the data amount rate, the correlation processor further performing second correlation processing to find a correlation between a plurality of scans of the stored image data before the change of the data amount rate, the image data being used as past echo signal scans, one scan being made of echo signals in a plurality of azimuths, and update the image data before the change of the data amount rate.

9. The echo image display device of claim 8, wherein the correlation processor finds the correlations by setting weight on the echo signals so that the weight of the echo signals from the past scan in the second correlation processing is larger than the weight of the echo signals from the past scan in the first correlation processing.

10. The echo image display device of claim 8, further comprising a moving speed detector for detecting a moving speed of a ship where the echo image display device is mounted, wherein the correlation processor sets weight on the echo signals and increases the weight of the echo signals from the past scan with an increase of the moving speed.

11. A method of displaying an echo image, comprising:

discharging electromagnetic waves from an antenna and receiving echo signals reflected on one or more target objects;

inputting the echo signals from the antenna;

detecting a level of each of the echo signals with reference to a distance and an azimuth from the antenna;

generating image data based on the levels of the echo signals;

displaying the image data on a display unit;

changing a data amount rate of a predetermined area that is set as a first part of a display area of the display unit, into a different rate in a second part of the display area, without increasing an amount of data in other parts of the display area; and changing a number of echo signal level detections within the predetermined area by increasing the number of detections along the azimuth direction or the distance direction without changing a number of echo signal level detections in other parts of the display area.

\* \* \* \* \*